(12) United States Patent
Boulanouar

(10) Patent No.: US 8,775,259 B2
(45) Date of Patent: Jul. 8, 2014

(54) SECURE SYSTEM AND PROCESS FOR IDENTIFICATION AND IDENTITY REGISTRATION

(75) Inventor: Ryad Boulanouar, UCCLE/Brussels (BE)

(73) Assignee: ABM Technologies, Alfortville (FR)

( * ) Notice: Subject to any disclaimer, the term of this patent is extended or adjusted under 35 U.S.C. 154(b) by 589 days.

(21) Appl. No.: 12/961,243

(22) Filed: Dec. 6, 2010

(65) Prior Publication Data

US 2012/0011010 A1 Jan. 12, 2012

(30) Foreign Application Priority Data

Jul. 8, 2010 (FR) ...................................... 10 55573

(51) Int. Cl.
*G06Q 20/00* (2012.01)
*G06Q 40/00* (2012.01)

(52) U.S. Cl.
USPC ..................... 705/17; 705/40; 705/44; 705/67

(58) Field of Classification Search
USPC ......................................... 705/17, 40, 67, 44
See application file for complete search history.

(56) References Cited

U.S. PATENT DOCUMENTS

| | | | |
|---|---|---|---|
| 7,512,567 B2 * | 3/2009 | Bemmel et al. ................. | 705/67 |
| 2003/0016800 A1 * | 1/2003 | Fukuda .................... | 379/142.01 |
| 2003/0055792 A1 * | 3/2003 | Kinoshita et al. ............... | 705/67 |
| 2003/0129948 A1 * | 7/2003 | Gab et al. ...................... | 455/67.1 |
| 2004/0253993 A1 * | 12/2004 | Nakamura ..................... | 455/567 |
| 2005/0090292 A1 * | 4/2005 | Yasutake ........................ | 455/567 |
| 2006/0200735 A1 * | 9/2006 | Ormond ........................ | 715/500 |
| 2009/0265653 A1 * | 10/2009 | Sodhi et al. .................... | 715/772 |
| 2009/0294523 A1 * | 12/2009 | Marano et al. ................ | 235/380 |
| 2011/0295695 A1 * | 12/2011 | Ishihara et al. ............ | 705/14.66 |

FOREIGN PATENT DOCUMENTS

| | | | |
|---|---|---|---|
| EP | 1 280 115 A2 | | 1/2003 |
| JP | 2003224663 A | * | 8/2003 |
| JP | 2006079459 A | * | 3/2006 |
| WO | 2006/074150 A1 | | 7/2006 |
| WO | 2008/002979 A2 | | 1/2008 |

* cited by examiner

*Primary Examiner* — Seye Iwarere
(74) *Attorney, Agent, or Firm* — Sughrue Mion, PLLC

(57) ABSTRACT

An identification and registration system including a scanner (J) for making a digital copy of an identity document (K), a server (A), transmission means for transmitting said digitized copy, character recognition means (E) for extracting from said digital copy information relating to identity, a database (B) for storing said digital copy and said identity-related information, a EPT/POS electronic payment terminal (I), transmission means for transmitting said identity-related information to said EPT/POS, a telephone (H) associated with a secret code, transmission means for transmitting the number of said telephone from said EPT/POS to said server, means for sending by said server to said EPT/POS a melody to be played, means (C) for calling said telephone by said server, and means of audio identification (C) by said server of said melody via said telephone call to said cellular telephone.

10 Claims, 4 Drawing Sheets

SECURE SYSTEM AND PROCESS FOR IDENTIFICATION AND IDENTITY REGISTRATION

Figure 1:
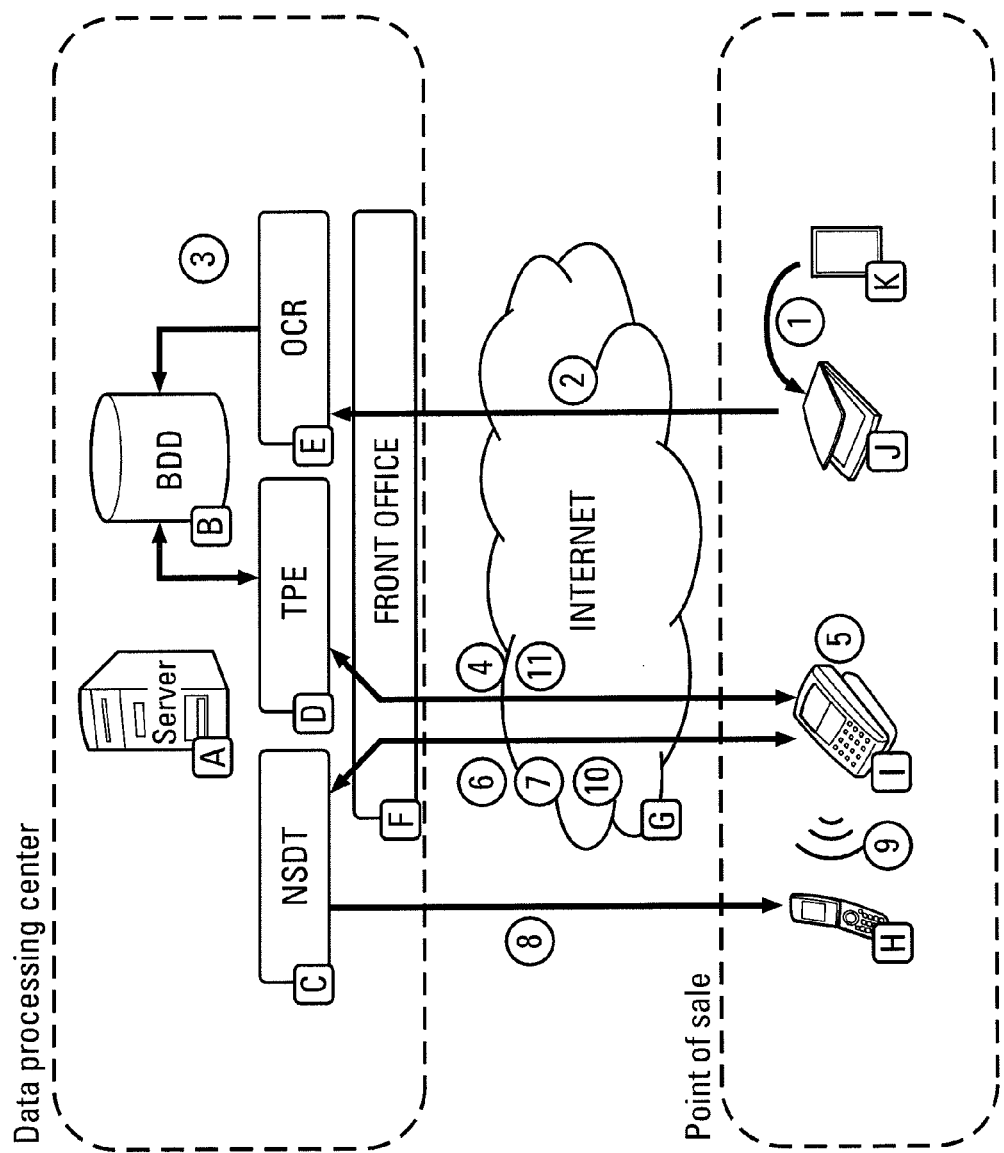

The present invention relates to a system and a process for secure identification and registration.

When a user wishes to register his identity, for example when he wishes to open a mobile telephone line with a telephone provider or carry out a money transfer, he must fill out one or more form(s), provide photocopies of his identity card or of his passport, which generally takes a long time. The points of sale involved are not always properly equipped with tables and chairs allowing users to fill out said forms without difficulty, so that it is often a long and complicated matter to have one's identity registered. Likewise, the time spent by counselors or salespersons in assisting users during this registration phase is lost as regards other users, which extends waiting times and reduces the profitability of the store proportionally. In addition, at present when a user registers, for example to open a telephone line, he can not use this registration for other services and must repeat this registration phase for each service to which he wishes to subscribe.

The present invention has the object of providing a secure identity registration and identification system and process which does not embody the aforementioned disadvantages.

In particular, the present invention has the object of providing a system and process of this kind which is simple and quick, while remaining extremely reliable and secure in order to avoid risk of fraud as much as possible.

The present invention also has as its object to provide a system and process of this kind which makes it possible to re-use several times the same identity registration, without having to repeat the entire procedure each time a new secure identification is needed.

The present invention also has the object of providing a system and process of this kind which is simple and has a low implementation cost.

The present invention therefore has as its object a secure identification and registration system, including:
copying means for creating a digital copy of an identity document belonging to the user to be identified,
at least one server,
first transmission means for transmitting said digitized copy to said server,
character recognition means for analyzing said digitized copy and extracting from said digitized copy information relating to the identity of the user of said digitized copy,
at least one database for storing said digital copy and said information relating to the identity of the user,
an electronic payment terminal, particularly one located at a point of sale,
second transmission means for transmitting said information relating to the user's identity to said electronic payment terminal,
a cellular telephone belonging to the user to be identified, associated with a secret code,
third transmission means for transmitting the number of said cellular telephone from said electronic payment terminal to said server,
means for sending a melody to be played from said server to said electronic payment terminal,
calling means allowing said server to carry out telephonic communication with said cellular telephone, and
means for audio authentication by said server of said melody played by said electronic payment terminal via said telephone communication with said cellular telephone.

Advantageously, said server includes an NSDT (Near Sound Data System) module allowing it to call said cellular telephone and to recognize a melody played by said electronic payment terminal.

Advantageously, a management module provides security for all transmissions.

Advantageously, transmission means use the Internet network.

Advantageously, an electronic payment terminal management module is associated with said server to manage communications between said server and said electronic payment terminal.

Advantageously, said electronic payment terminal includes a display, a keyboard, a printer, a magnetic card reader, a loudspeaker and an Internet connection module.

Advantageously, said copy means include a scanner.

Advantageously, at a point of sale, a scanner, a pad and a EPT/POS are connected to a management box that manages the components' connections and links to each other and to the server.

Advantageously, said management box, said scanner and said pad make up a single integral unit.

The present invention also has as its object a secure identification and identity registration process, including the following steps:
make a digital copy of an identity document belonging to the user to be identified,
transmit said digital copy to a server,
carry out character recognition of said digital copy to extract from said digital copy information related to the user's identity,
store said digital copy and said information relating to the user's identity in at least one database,
transmit to an electronic payment terminal, particularly one located at a point of sale, said information relating to the user's identity,
display said information relating to the user's identity on said electronic payment terminal's display,
enter into said electronic payment terminal the telephone number of a cellular telephone belonging to the user to be identified,
enter into said electronic payment terminal a secret code associated with said telephone number,
transmit said telephone number to said server if said secret code is correct,
send from said server to said electronic payment terminal a melody to be played,
carry out telephonic communication with said cellular telephone from said server,
transmit to said server, via said telephonic communication, said melody played by the electronic payment terminal, and
have said melody authenticated by said server.

Figure 2:
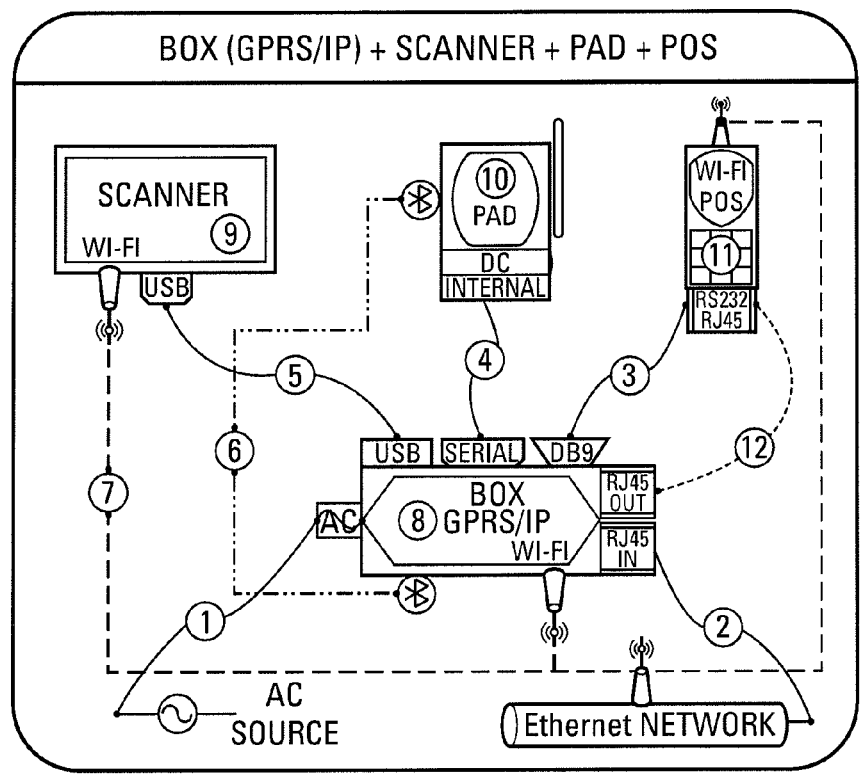
Figure 3:
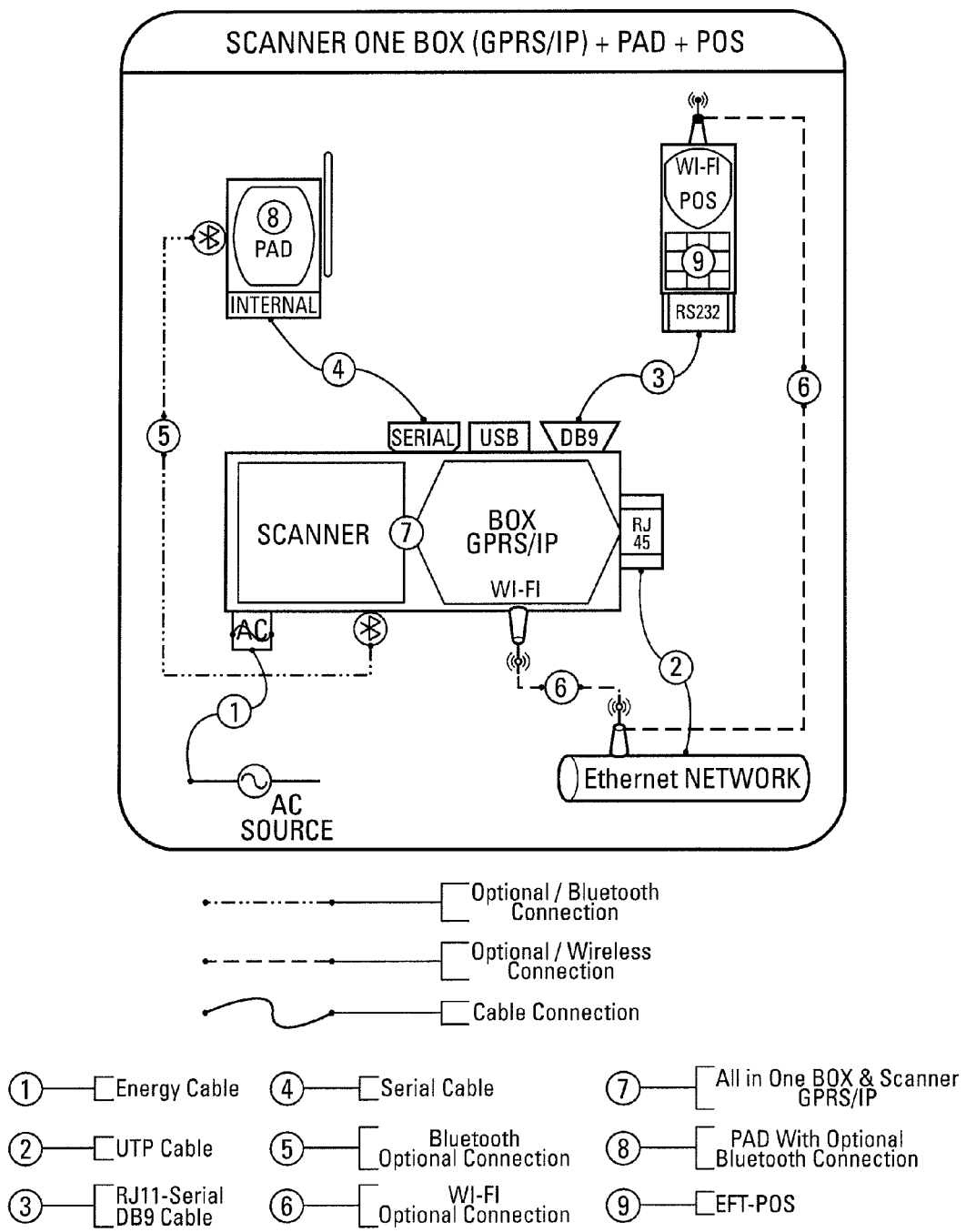
Figure 4:
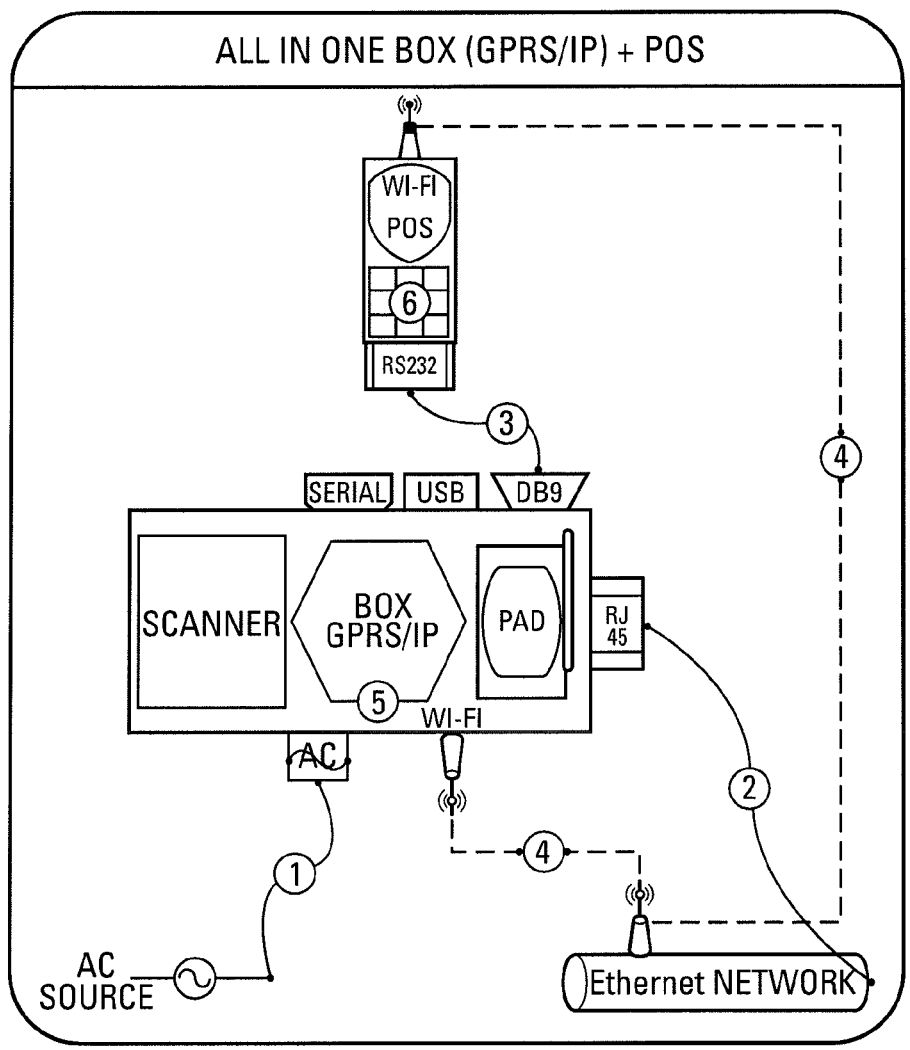

These features and advantages of the present invention will appear more clearly in the following detailed description of it, made with reference to the attached drawings, given as non-limiting examples and in which:

FIG. 1 shows a functional schematic illustrating the components of the system and the steps in the process of the present invention, according to an advantageous embodiment of them, and FIGS. 2 through 4 are hardware configuration variations usable in implementing the present invention.

Referring to FIG. 1, the secure identity registration and identification system of the present invention has several components that are part of a data processing center, and several other components that are part of or are provided at the point-of-sale location, these various elements being interconnected particularly through the Internet network.

More specifically, the data processing center includes at least one server A. These servers are advantageously housed in a secure and controlled data processing center. The remainder of the description will be made with reference to a single server A, but it is understood that several servers can be contemplated.

At the point of sale, where the user who wishes to register or to be identified goes, copy means J are provided for making a digital copy of identity document K belonging to the user to be identified. Preferably, copy means J are made in the form of a scanner. This scanner incorporates first transmission means for transmitting said digitized copy to said server A. Advantageously, these first transmission means use the Internet network G, particularly via a TCP/IP, PPP or GPRS connection. As a variation, the user could also send, for example by email, a digital copy of his identity document directly to the server, for example through a dedicated Internet registration site. At the data processing center, character recognition means E are provided for analyzing said received digital copy. This analysis is used in particular to extract from said digital copy information relating to the user's identity. Advantageously, these character recognition means are constituted by an OCR ("Optical Character Recognition") module which is associated with the server. This OCR module can in particular decode the readable field of modern identity cards or passports called the MRZ ("Machine-Readable Zone"). It also makes it possible to retrieve the photo from the identity document as well as conventional information such as name, birth date, expiration date, etc. The digital copy of the identity document, as well as said information relating to the user's identity, are then transmitted to one or more databases B to be stored there. These databases are therefore secured and replicated and access to the data is controlled.

Thus, the digital copy is only needed for registering the user. Subsequently, to identify himself, this digital copy stored in the database and/or the identity-related information that has been extracted can be compared with the user's actual identity document.

At the point of sale location, an electronic payment terminal I, hereafter designated EPT/POS, advantageously includes a display, a keyboard, a printer, a magnetic card reader, a loudspeaker and an Internet connection module. Advantageously, the EPT/POS includes a chip-card reader which allows information to be read (for example from sesame and vitale cards, electronic ID cards, etc.) as well as an RFID contactless reader which makes it possible to read biometric passports having RFID chips. These can then be exploited to acquire and enrich the user's profile. The display typically has several lines, four for instance, and the keyboard may be either numeric or alphanumeric. The Internet network connection may also be accomplished by TCP/IP or GPRS connection. The scanner and the EPT/POS could be linked so as to share connectivity. Second transmission means will be used to transmit information relating to the user's identity from the database B to said EPT/POS. This transmission occurs preferably via the Internet network. At the processing center location, a transaction or EPT/server transmission management module D is provided to provide management and authentication of the EPT/POS pool as well as the processing center's teller window interface (or "front office"). In fact, the data processing center includes preferably a front office module which provides concentration of connections, data integrity checking and communication security.

When identity-related information is transmitted to the EPT/POS, it will be displayed on the display of said EPT/POS. The person in charge of the EPT/POS, that is to say the point-of-sale salesperson, will therefore be able to carry out a preliminary check by comparing the display on his EPT/POS with the identity document that the user will show him. It should be noted that this visual verification step by the salesperson is not absolutely essential to the proper operation of the system and the process of the present invention.

To ensure secure identification of the user, a telephone H belonging to said user to be identified is employed, preferably his cellular or mobile telephone. For example, this telephone number can be passed to the point of sale or transmitted by email together with the digital copy of the identity document. The number of said telephone is associated with a secret code previously transmitted to the user. Advantageously, this secret code, which can for example be made up of from four to six numerals, may be selected confidentially by the user upon registration, or later if he wishes to change it. This secret code is used to encrypt the user's confidential information in the database, and is therefore needed for identification and/or information transfer to third-party organizations. In the event of loss of this code, the registration will preferably be done over again for security reasons. The user will then enter his telephone number at the keyboard of said EPT/POS. He will also enter said associated secret code. If said secret code is correct, that is if it corresponds to the secret code associated with the telephone number, then third transmission means will transmit said telephone number entered at the EPT/POS to said server. Once again, this transmission is preferably carried out via the Internet network. In return, the server will send to said EPT/POS, via appropriate means, a random melody, so that this melody can be played by said EPT/POS. This transmission of the melody is advantageously also carried out via the Internet network.

The server includes telephone calling means C allowing said server to call said telephone. Advantageously, these calling means consist of an NSDT ("Near Sound Data System") module. The telephone call to the user's telephone by said server is carried out just after the transmission of the melody to said EPT/POS. The user picks up his telephone when he receives the call from the server and brings his telephone close to said EPT/POS so as to transmit said melody played by said EPT/POS via said telephone call. Said server then authenticates said melody as being that which it transmitted earlier to the EPT/POS, which allows it to clearly identify the telephone number associated with the information relating to the identity in the database. The server's audio authentication means are advantageously included in the NSDT module.

Thus, the invention provides a secure identity registration and identification system and process which makes it possible in very little time, typically two to three minutes, not only to register but also to identify oneself in a totally secure manner. In fact, in order to defraud the system of the invention, not only would it be necessary to present a false identity card, but also to succeed in stealing the telephone and the secret code associated with said telephone in order to possibly defeat the system. An optional step of checking the information relating to the identity displayed on the EPT/POS against the user's actual identity document reinforces still further the security of the system. Of course, with the future generation of EPT/POS, or with the pad described hereinafter in FIGS. 2 through 4, all or nearly all of the of the digital copy of the identity document, including the photo, will be displayable on the screen of the EPT/POS and/or the pad, which will facilitate identity verification still further.

The process is especially simple. The user who wishes to identify himself visits a point of sale; he shows his identity card to the salesperson and types into the EPT/POS his telephone number and his secret code. The EPT/POS transmits the telephone number to the server if the secret code is correct. Said server then sends the random melody to the EPT/POS and immediately calls the telephone. The user picks up and brings the telephone close to the EPT/POS, which reproduces said melody that was sent earlier, and the server validates the authentication if it recognizes the melody played as being that previously sent. Typically, the telephone is placed less than 30 cm away from said EPT/POS at the time when the audio recognition is carried out, to avoid stray noises if possible.

The registration platform of the invention allows customers to be registered in two to three minutes at points of sale equipped with electronic payment terminals and with scanners having the ability to send email. Registration with strong authentication accomplishes the secure storage of the digital copy of the customer's identity document in a data processing center, the registration of the customer's mobile telephone number as "public data," the registration of the customer's confidential code as "confidential data," and the recognition of the customer's mobile by audio authentication in order to verify that the telephone number entered is that of the telephone that is actually in the customer's possession.

One advantage of the present invention is that once a user is registered, and his registration is authenticated, he can use this "electronic identification" each time he wishes to identify himself to any service. Thus, he identifies himself electronically the first time according to the invention so as for example to open a telephone line; he can then, if he goes into a point of sale offering money transfer service, identify himself in the same manner by using the identification procedure of the present invention, which allows him to use the various services that recognize this electronic identification. The present invention thus makes it possible to achieve a very considerable time savings, spares the users repetitive, long and painstaking registrations, simplifies the work of the salespeople and makes it more effective, and has a very high security characteristic. The present invention therefore applies to any type of service that requires sure identification, such as opening bank accounts, money transfers, etc.

Advantageously, the user's profile can be enriched with further documents, such as driver's licenses, insurance certificates, utility bills, etc. This makes it possible to provide a complete profile, all or part of the information in which can be transmitted to third-party services.

FIGS. 2 through 4 illustrate hardware configurations that can be contemplated for implementing the present invention. Thus, in the configuration illustrated schematically in FIG. 2, a scanner 9, an electronic payment terminal (EPT/POS) 11 and a pad 10 are connected to a box 8 which provides interconnection and the links between these components and the system's server(s). The connections may be wired or wireless. A typical configuration is that in which the user/customer is separated from the salesperson who greets him at the point of sale, typically by a window with possibly an opening below allowing documents to pass. The box and the scanner can then be located on the salesperson's side, the EPT/POS being able to pass from one side of the separator to the other. The user passes his identity document to the salesperson who scans it, and the pad, preferably equipped with a display, displays the user-readable information, for example a scanned copy of his identity document for verification and validation. The pad can also serve for collecting the user's signature by means of an appropriate stylus. In one variation, the pad may include a camera, of the webcam type for example, to make a digital photo of the user during the registration phase. This pad could also include a microphone to capture a sentence spoken by the user for later voice recognition. The pad could also include loudspeakers suitable for reproducing sounds, for example the melody to be played sent by the server. Therefore, depending on the contemplated use, the pad can be the principal user interface, rather than the EPT/POS. In the example of FIG. 3, the scanner and the box are combined in one and the same integral unit, and in the example of FIG. 4, the pad is also integrated into this complete unit. These implementations of FIGS. 3 and 4 simplify the cabling and the connections, whether wired or not, between the various components of the system. In certain applications, however, it may be preferable to keep each component separate from the others, as in the example of FIG. 2. FIGS. 2 through 4 illustrate examples of the types of links and/or connections that are possible (USB, Serial, RJ45, RJ11, Bluetooth, Wi-Fi, etc.).

Although the present invention has been described with reference to particular embodiments, it is understood that it is not limited to the examples shown in the drawings, but on the contrary a person skilled in the art can apply any useful modification to it without departing from the scope of the present invention as described in the annexed claims.

The invention claimed is:

1. A secure identification and identity registration system, comprising:

copying means (J) for making a digital copy of an identity document (K) belonging to the user to be identified, at least one server (A), first transmission means for transmitting said digitized copy to said server, character recognition means (E) for analyzing said digital copy and extracting from said digital copy information relating to the identity of the user of said digital copy, at least one database (B) for storing said digital copy and said information relating to the user's identity, an electronic payment terminal (I), particularly one located at a point of sale, second transmission means for transmitting said information relating to the user's identity to said electronic payment terminal, a cellular telephone (H) belonging to the user to be identified, associated with a secret code, third transmission means for transmitting the number of said cellular telephone from said electronic payment terminal to said server, means for sending a melody to be played from said server to said electronic payment terminal, calling means (C) allowing said server to carry out telephonic communication with said cellular telephone, and means (C) for audio authentication by said server of said melody played by said electronic payment terminal via said telephone call with said cellular telephone.

2. The system according to claim 1, in which said server includes an NSDT (Near Sound Data System) module configured to call said cellular telephone and to recognize a melody played by said electronic payment terminal.

3. The system according to claim 1, in which a management module (F) provides security for all communications.

4. The system according to claim 1, in which the transmission means use the Internet network (G).

5. The system according to claim 1, in which an electronic payment terminal management module (D) is associated with said server for managing communication between said server and said electronic payment terminal.

6. The system according to claim 1, in which said electronic payment terminal includes a display, a keyboard, a printer, a magnetic card reader, a loudspeaker and an Internet connection module.

7. The system according to claim 1, in which said copying means include a scanner.

8. The system according to claim 1, in which, at a point of sale, a scanner, a pad and an electronic payment terminal/point of sale location (EPT/POS), are connected to a management box that manages the connections and links of these components to one another and with the server.

9. The system according to claim 8, in which said management box, said scanner and said pad make up a single integral unit.

10. A secure identification and identity registration process, comprising the steps of:
- make a digital copy (1) of an identity document (K) belonging to the user to be identified,
- transmit (2) said digital copy to a server (A),
- perform character recognition on said digital copy to extract from said digital copy information relating to the user's identity,
- store (3) said digital copy and said information relating to the user's identity in at least one database (B),
- transmit (4) to an electronic payment terminal (I), particularly one located at a point of sale, said information relating to the user's identity,
- display (5) said information relating to the user's identity on said electronic payment terminal's display,
- enter into said electronic payment terminal the telephone number of a cellular telephone (H) belonging to the user to be identified,
- enter into said electronic payment terminal a secret code associated with said telephone number,
- transmit (6) said telephone number to said server if said secret code is correct,
- send (7) from said server to said electronic payment terminal a melody to be played,
- make a telephone call (8) to said cellular telephone from said server,
- transmit (9) to said server, via said telephone call, said melody played by the electronic payment terminal, and have said melody authenticated by said server.

\* \* \* \* \*